No. 882,686. PATENTED MAR. 24, 1908.
R. IRELAND & H. W. COLE.
CAP FOR THE PROTECTION OF THE HUMAN HEAD.
APPLICATION FILED JULY 27, 1907.

Witnesses:—
V. G. Armstrong.

Inventors:—
Robert Ireland,
Hector W. Cole,
By
ATTORNEY.

UNITED STATES PATENT OFFICE.

ROBERT IRELAND AND HECTOR WILLIAM COLE, OF KALGOORLIE, WESTERN AUSTRALIA, AUSTRALIA.

CAP FOR THE PROTECTION OF THE HUMAN HEAD.

No. 882,686.  Specification of Letters Patent.  Patented March 24, 1908.

Application filed July 27, 1907. Serial No. 386,148.

*To all whom it may concern:*

Be it known that we, ROBERT IRELAND, a subject of the King of Great Britain and Ireland, residing at Kalgoorlie, in the State of Western Australia, in the Commonwealth of Australia, and HECTOR WILLIAM COLE, a subject of the King of Great Britain and Ireland, residing at Kalgoorlie, in the State of Western Australia, in the Commonwealth of Australia, have invented certain new and useful Improvements in Caps for the Protection of the Human Head, of which the following is a specification.

The purpose of this invention is to provide a neat, sightly, close fitting cap which will protect the head of the wearer from concussion or other injury in case of accident. It will be of special value to motorists, jockeys, combatants in military competitions and other persons whose occupation or pastimes subject them to special risk of the nature above indicated. With this object in view we construct a cap of any suitable fabric provided with a pair of pneumatic tubes which surround the head ascending spirally from the base to the top of the crown. But in order that our invention may be clearly understood reference will now be made to the accompanying drawings in which:—

Figure 1:
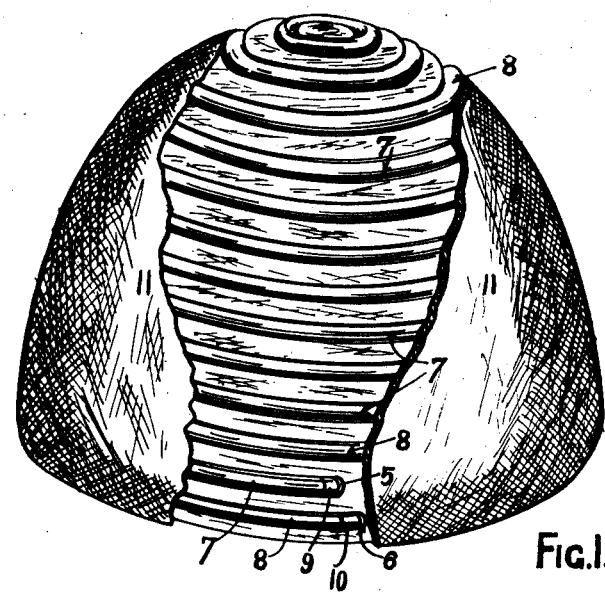
Figure 2:
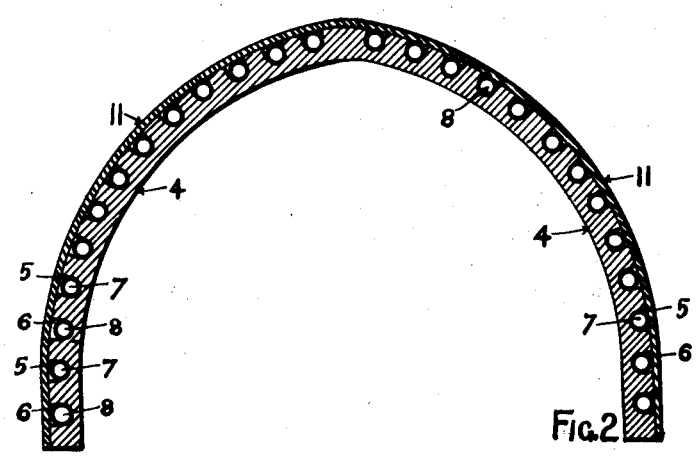
Figure 3:
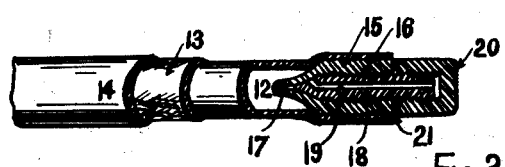

Figure 1 is a perspective view of this invention with the outside covering partly broken away. Fig. 2 a central section thereof. Fig. 3 a sectional view of a valve attached to the end of the tubing.

Throughout the several figures of the drawings we have employed the same character of reference to indicate similar parts.

The inner head-covering, or body of the cap 4, preferably is relatively thick and has two sets of spiral flutes 5 and 6 surrounding it, arranged to take the air tubes 7 and 8 which are provided with valves 9 and 10 placed preferably at the back of the cap in about the positions indicated in the drawings. The whole is inclosed in a covering of silk or other suitable material 11. The tubing consists preferably of an inner rubber tube 12 covered with silk or other fabric 13, and an outside layer of rubber 14. The valve consists of a firm rubber nipple 15 secured to the tubing in the usual manner.

The nipple 15 has a female threaded orifice 16 terminating in smaller orifice 17. A threaded plug 18 has channel 19 and is screwed into the orifice 16 and projects sufficiently beyond the nipple to receive a cap 20, screwed firmly against the nipple, a rubber washer 21 is provided if deemed necessary.

We do not of course bind ourselves to the particular form or construction of valve or tubing described, but simply indicate those we consider most suitable.

When the pneumatic tubes are inflated every portion of the head beneath the cap is protected by a cushion of air strongly incased and even if one of the air tubes should become punctured, or from any other cause deflated, there will still remain one complete spiral of pneumatic tubing surrounding the head from the base of the skull to the top of the crown.

The body of the cap itself is of sufficient thickness to afford suitable protection for the head of the wearer under ordinary circumstances, and this is supplemented by a plurality of independent tubes spirally positioned thereon from base to crown. These are exteriorly reinforced, so that they may be filled with air up to the pressure desired, and being practically inextensible, afford this added and independent protection without altering the size or contour of the cap. This also holds true should one of the tubes become deflated. These tubes being closely positioned, as they are, insure maximum protection for the head of the wearer.

What we claim and desire to secure by Letters Patent is:—

1. An improved cap for the protection of the human head consisting of cotton, silk, leather or other suitable material provided with spiral fluting so arranged as to carry, secure and protect a pair of air tubes, substantially as set forth.

2. In an improved cap for the protection of the human head a pair of air tubes secured in the material and ascending spirally from the base to the crown, substantially as set forth.

3. In an improved cap for the protection of the human head the combination of a spirally fluted body or bed of any suitable material; and a pair of spirally arranged air tubes and the necessary valves, substantially as set forth.

4. In a protective cap of the class described, the combination with a thick, tight-fitting body-portion, having suitable recesses therein and forming a partial protection for the head, of pneumatic chambers positioned within said recesses and closely adjacent, throughout the surface of the cap, substantially as set forth.

5. In a protective head-covering, the combination with a body-portion of relatively thick material, and a plurality of pneumatic tubes associated therewith and covering a considerable area of the same, whereby a maximum of protection is secured, substantially as set forth.

6. In a protective head-covering of the class described, the combination with a body-portion formed of relatively thick material to afford a partial protection for the head, of an associated pneumatic tube of substantially inextensible construction, wound spirally about said body portion; the coils thereof being closely positioned from the rim to the crown thereof, substantially as set forth.

7. In a protective head-covering of the class described, the combination with a body-portion formed of relatively thick material to afford a partial protection for the head, and provided with ascending spiral recesses, and a pneumatic tube provided with an exterior covering positioned within each of said spiral recesses and adapted to afford additional protection for the wearer's head, substantially as set forth.

8. In a protective head-covering of the class described, the combination with a body-portion formed of relatively thick material to afford a partial protection for the head, and provided with spiral recesses extending from the rim to the crown, of a plurality of independent pneumatic tubes of substantially inextensible construction respectively disposed within the recesses, substantially as set forth.

In testimony whereof we affix our signatures in the presence of two witnesses.

ROBERT IRELAND.
HECTOR WILLIAM COLE.

Witnesses:
E. THO. RANDALL,
EDWARD ARTHUR GRIFFITH.